United States Patent [19]

Merval et al.

[11] Patent Number: 4,945,413

[45] Date of Patent: Jul. 31, 1990

[54] LINE SYNCHRONIZATION DETECTION CIRCUIT

[75] Inventors: Jean-Marc Merval, Saint Egreve; Danika Perrin, Grenoble, both of France

[73] Assignee: SGS-THOMSON Microelectronics S.A., Gentilly, France

[21] Appl. No.: 312,006

[22] Filed: Feb. 17, 1989

[30] Foreign Application Priority Data

Feb. 19, 1988 [FR] France ............... 88 02266

[51] Int. Cl.⁵ .................. H04N 5/12; H04N 5/10
[52] U.S. Cl. .................. 358/158; 358/153; 358/148
[58] Field of Search ............ 358/148, 149, 150, 153, 358/154, 158

[56] References Cited

U.S. PATENT DOCUMENTS

| | | | |
|---|---|---|---|
| 4,203,076 | 5/1980 | Yamashita | 358/158 |
| 4,467,359 | 8/1984 | Hosoya | 358/159 |
| 4,498,103 | 2/1985 | Aschwanden | 358/158 |
| 4,520,393 | 5/1985 | Zwijsen et al. | 358/149 |
| 4,535,359 | 8/1985 | Duijkers | 358/158 |
| 4,769,704 | 9/1988 | Hirai et al. | 358/158 |
| 4,809,068 | 2/1989 | Nagai | 358/153 |

FOREIGN PATENT DOCUMENTS

| | | |
|---|---|---|
| 0091719 | 10/1983 | European Pat. Off. . |
| 0253402 | 1/1988 | European Pat. Off. . |
| 140035 | 8/1982 | Japan ............ 358/158 |
| 1160606 | 6/1985 | U.S.S.R. ............ 358/148 |

OTHER PUBLICATIONS

"Deflection Processor Eliminating TV Hold Controls"; by Andy Hennigan; Electronic Engineering; May 1984; pp. 77–80.

*Primary Examiner*—John W. Shepperd
*Assistant Examiner*—Michael D. Parker
*Attorney, Agent, or Firm*—Lowe, Price, LeBlanc, Becker & Shur

[57] ABSTRACT

A detection circuit of a line synchronization signal in a video signal wherein the synchronization signal is sent to a phase locked loop (PLL) comprises a voltage controlled oscillator (8), for supplying a line scanning signal to a display. The following steps are provided: inhibiting the operation of the loop and setting the VCO to its free frequency, in the absence of the line synchronization signal; supplying a detection window in relation with the oscillations of the VCO; and detecting the presence of the synchronization signal in this window for supplying either an enabling signal after the detection of a determined number of synchronization tops, this enabling signal connecting again the VCO in the loop, or an inhibiting signal if the detection is interrupted during the determined number of synchronization tops.

8 Claims, 4 Drawing Sheets

LINE SYNCHRONIZATION DETECTION CIRCUIT

BACKGROUND OF THE INVENTION

The instant invention relates to TV sets and more particularly to a circuit detecting the presence or absence of line synchronization pulses in a composite video signal.

Indeed, among the various circuits constituting a TV set, it is useful, in addition to the circuits designed to form the line scanning signals from the line synchronization pulses, to check if those line synchronization pulses are properly received. The output of a line synchronization detection circuit is liable, for example, to be used for stopping the initial frequency hunting of the TV automatic tuning circuits when a transmission is picked up on the antenna, in order to stop the TV loudspeakers in the absence of a transmission for avoiding to generate noise, or for lowering for a short lapse of time the servo control time constant of the phase locked loop (PLL) of the circuit supplying the line scanning signal in order to accelerate the locking of this loop during the detection of a transmission or a change of channel.

Such circuits are already known in the prior art, an example of which is illustrated in FIG. 1.

In the circuit shown in FIG. 1, the video signal liable to incorporate the synchronization pulses is received on a terminal 1 and sent to a separator circuit of the synchronization signal 2. The output 3 of this synchronization separator circuit is sent to an input of the PLL comprising a multiplier or phase comparator 4, a filter 5 associated with a capacitor 6 external to the integrated circuit, a voltage controlled oscillator (VCO) 8 associated with a quartz 9 external to the integrated circuit, and a divider 10 connected to the output 11 of the VCO and the output 12 of which is connected to the other input of the multiplier 4. The line scanning signal is available at the output 12 of divider 10. This divider 10 is useful because the VCO 8 is liable to operate, not at a frequency close to the desired frequency of the synchronization signal, but at a frequency multiple of the latter, due to the fact one chooses for setting the free frequency of the VCO a frequency range wherein low cost quartz are available.

The video signal detection circuit comprises a coincidence detector 14 receiving the output 3 of the sync separator 2 and the output 12 of the servo control loop. This detector 14 supplies a charging current to a capacitor 16, external to the integrated circuit, when its two input signals are in the coincidence phase, the voltage on this capacitor 16 being compared with a reference voltage by a comparator 17 for supplying the video detection signal on an output terminal 18. Moreover, this figure shows a connection between the video detection signal and the filter 5. This connection is often used for modifying the time constant of the filter. Indeed, in the absence of the line synchronization signal, it is desirable that the loop picks up the signal received as fast as possible, and for this purpose one chooses to impart a short time constant to the filter. But, on the contrary, once the loop is locked, it is desirable to increase the time constant of the filter in order to improve the stability and the noise cancellation.

Because of the continuous progresses and the improvements in quality that are expected from TV sets, it appears that this detection device for synchronization signals according to the prior art is becoming inadequate. Indeed, it presents some drawbacks. In particular, the operation of the detection circuit presupposes the operation of the PLL. Owing to the fact that this PLL operates continuously, even in the absence of synchronization signals on the input terminal of the video signal, a not clearly determined frequency scanning occurs during those phases. This can be a nuisance in some cases when one tries for example to incrust a text into a picture by using the line scanning. On the other hand, as regards the manufacturing costs, this analog-type circuit according to the prior art, necessitates a capacitor 16 having a substantially high value for storing the signals supplied by the coincidence detector 14 and getting rid of the noise. It is well known in the field of integrated circuit manufacturing that, for reducing the manufacturing costs of a circuit, it is essential to increase its integration to the maximum and to avoid using external terminals as well as the high value capacitors that cannot be integrated.

An object of the instant invention is to provide for a video signal detection circuit free from all the drawbacks of the circuits according to the prior art, such a circuit being entirely digital, not requiring the use of an external capacitor and the operation of which is independent of the locking of the PLL.

SUMMARY OF THE INVENTION

In order to achieve those objects and others, the instant invention provides for a detection circuit of a line synchronization signal in a video signal, wherein a synchronization signal is sent to a PLL comprising a voltage controlled oscillator (VCO) in order to supply a line scanning signal to a display means. This circuit further comprises first means for inhibiting the operation of the loop and letting the VCO oscillate at its free frequency, close to the desired line frequency or multiple of this desired line frequency, in the absence of the line synchronization signal; second means for supplying a detection window in relation with the oscillations of the VCO; third means for detecting the presence of the synchronization signal in said window; fourth means for supplying, either an enabling signal after the detection of a determined number of synchronization tops by the third means, this enabling signal switching again the VCO in the loop, or an inhibiting signal if said detection is interrupted during said determined number of synchronization tops, this inhibiting signal acting upon said first means.

According to an embodiment of the instant invention, the fourth means comprise an up/down counter incrementing or decrementing as a function of the output of the third means and flip-flop means, acting in such a way that the enabling signal is supplied as soon as the up/down counter has reached a predetermined counting and until it has counted down to a null value.

According to an embodiment of the instant invention, said loop comprises a filter, the time constant of which is liable to be switched between high and low values and which is switched at a low value from the occurrence of the enabling signal, during a period of time determined by a counter.

According to an embodiment of the instant invention, the conductor liable to receive the synchronization tops is connected to the third means through a filter, the cut-off frequency of which can be switched between a high and a low value, the switching at the high value occurring in the presence of the enabling signal.

According to an embodiment of the instant invention, the VCO has a free frequency which is an n-fold multiple of a frequency close to the desired line synchronization frequency, the second means comprising a counter followed by an AND gate connected to the input of a flip-flop supplying a signal at a first level during a first predetermined number of pulses of the VCO, the corresponding duration being lower than the desired period of the lien synchronization signal, and a signal at a second level forming a window during, at the most, a second predetermined number of pulses of the VCO, the duration corresponding to he counting of the sum of the first and second numbers being higher than said desired period, and means for resetting said counter at the end of the counting of the second number or in response to the occurrence of a synchronization top in the window.

Thus, according to the invention, one avoids associating an external capacitor with the video signal detection circuit and, in the absence of the line synchronization signal, the VCO is liable to operate at its free frequency predetermined by the associated quartz, which supplies a stable line scanning signal to the TV set, that is liable to be used, for example, for realizing incrustations on the screen.

BRIEF DESCRIPTION OF THE DRAWINGS

Those objects, features, advantages and others of the instant invention will clearly appear from the following detailed description of a preferred embodiment, in connection with the attached drawings, wherein.

DETAILED DESCRIPTION OF THE DRAWINGS

Figure 1:
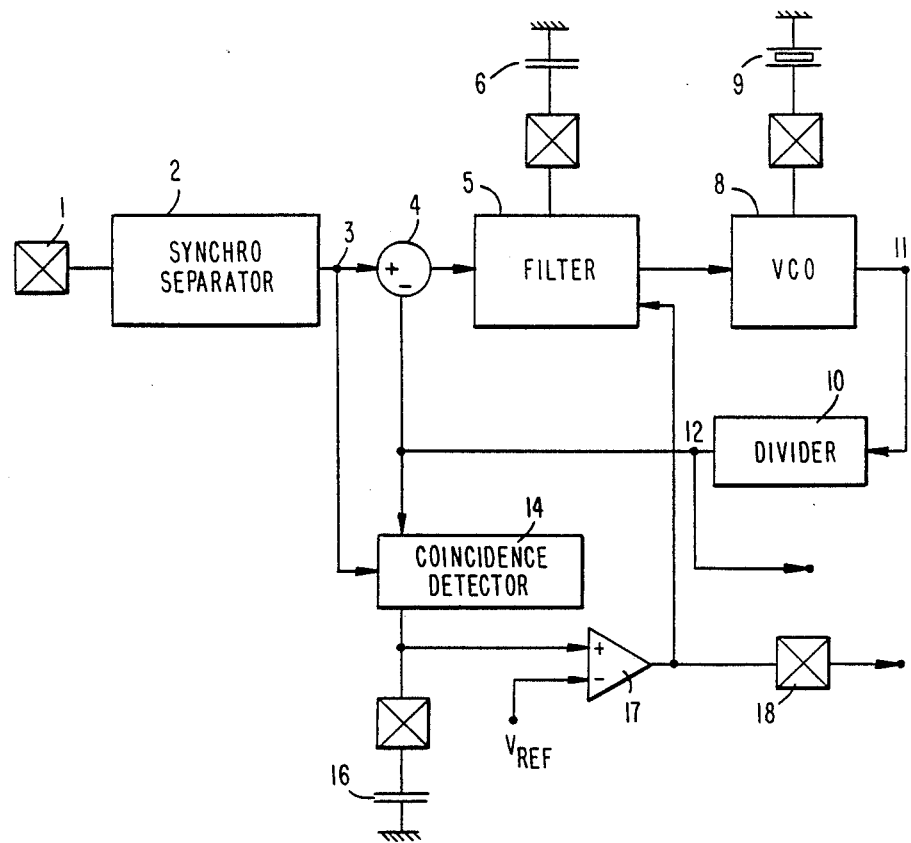
FIG. 1 hereinabove described shows a circuit for supplying a line scanning signal and for detecting a line synchronization signal according to the prior art.
Figure 2:
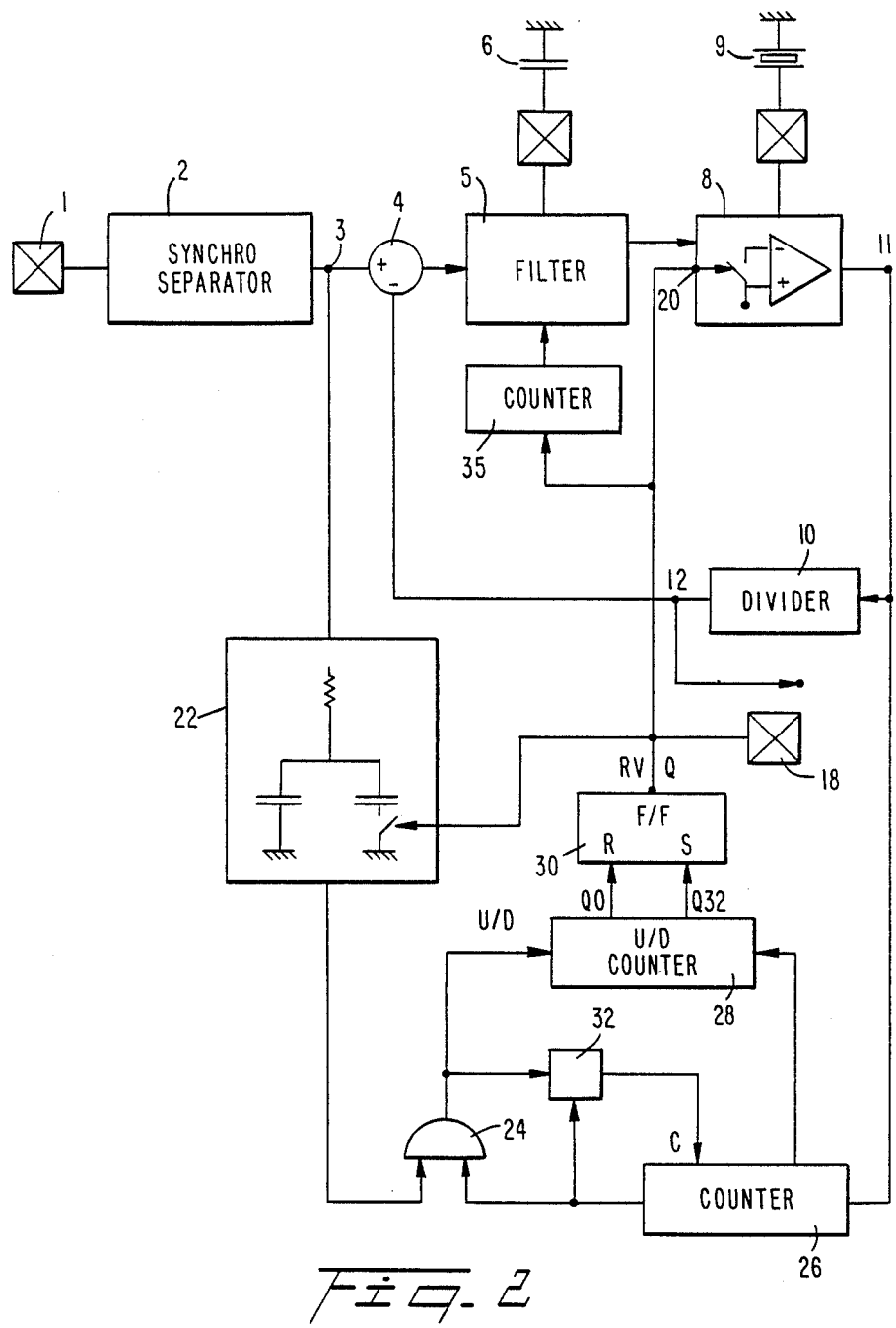
FIG. 2 shows a circuit for supplying a line scanning signal and for detecting a line synchronization signal according tot eh instant invention.

In FIG. 2, the same components as in FIG. 1 are labelled with the same reference numerals. Thus, FIG. 2 again shows the connections and components designated by references 1-12. As in case of FIG. 1, the filter 5 comprises a time constant switching input. Unlike FIG. 1, the VCO shown in FIG. 8 comprises switching means controlled by an input terminal 20 for determining whether the VCO 8 is connected in the PLL or whether said VCO operates at its free frequency determined by the quartz 9.

The synchronization signal detection circuit according to the instant invention comprises a low-pass input filter 22 receiving the synchronization signal possibly present at the output of the sync separator 2 and supplying its output signal to a first input of an AND gate 24. The second input of said AND gate 24 is connected to the output of the VCO 8 through a window generation counter 26. The output of the AND gate 24 is connected to the input of the up/down counting input (U/D) of an up/down counter 28, the signal input of which is supplied by an output of the counter 26. The up/down counter comprises a first output $Q_{32}$ indicating it has reached its maximum counting and a second output $Q_0$ indicating it has been reset. Those outputs $Q_{32}$ and $Q_0$ are respectively connected to the inputs S (set) and R (reset) of a flip-flop 30, the Q output of which supplies the desired detection signal of the line synchronization signal on terminal 18. A logic circuit 32 is connected to the clear terminal C of counter 26 for having its counting to start from zero, either at the end of the window provided by this counter 26, or when the AND gate 24 has indicated the presence of the synchronization pulse in the window.

The operation of the circuit shown in FIG. 2 will be described in more detail in relation with a preferred embodiment illustrated in FIG. 3. It will be noted that the line synchronization detection signal RV is used inside the circuit itself in three ways :

it is applied to the control terminal 20 of the VCO 8 in order to connect it into the loop when the synchronization signal has been detected, and to force it to operate at its free frequency in the absence of the line synchronization signal ;

it is sent to a counter 35 connected to filter 5 for forcing said filter 5 to operate with a relatively short time constant from the moment the line synchronization signal has been detected, for example for a time duration of four TV frames, and then force it to operate at a larger frequency permitting a better stability of the loop and a more substantial suppression of the noise ;

it is applied to filter 22 so that the filter selectivity is lower once the line synchronization signal has been detected (its cut-off frequency will be increased).

Figure 3:
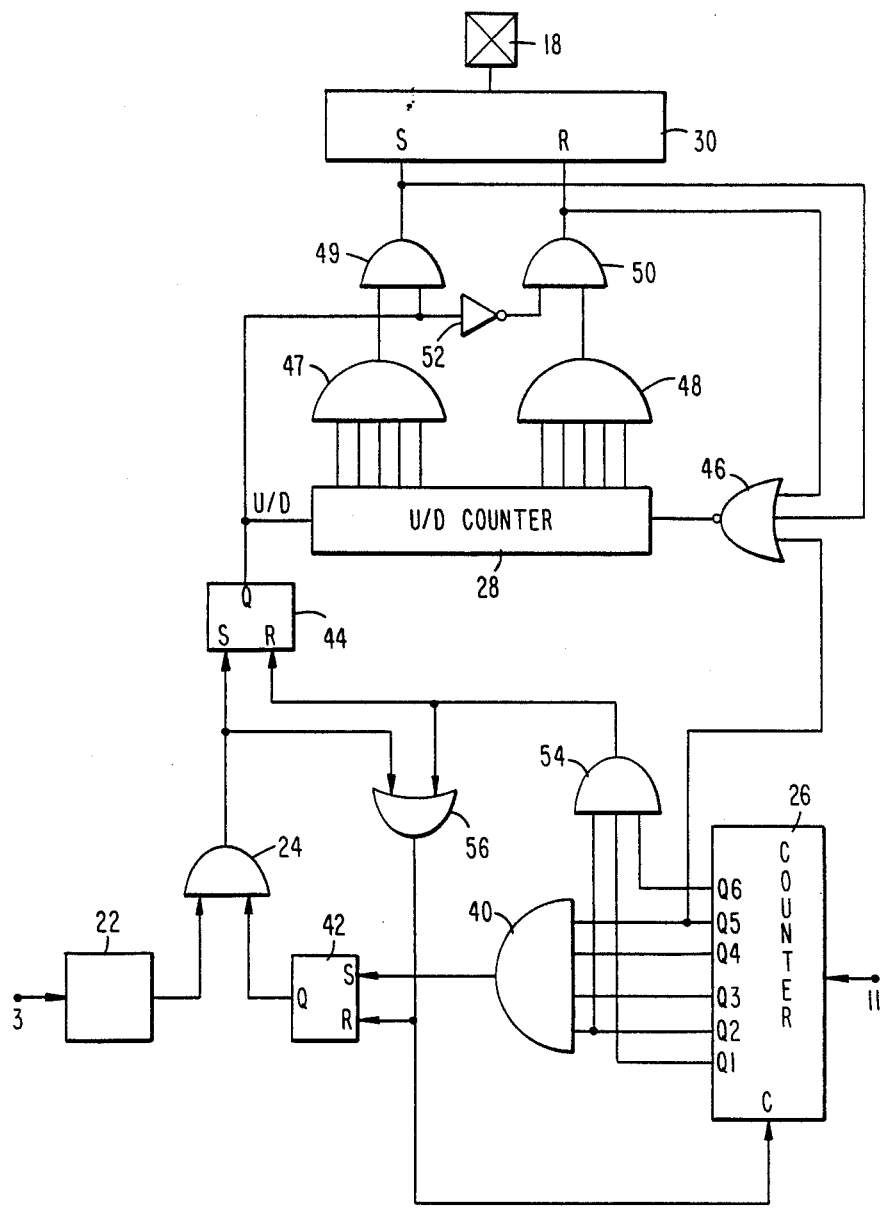
FIG. 3 shows in more detail an embodiment of the video detection circuit according to the instant invention.

FIG. 3 shows a preferred embodiment of the invention. The same components shown in FIG. 2 are designated by the same reference numerals. Thus, FIG. 3 again shows filter 22, AND gate 24, counter 26, up/-down counter 28 and flip-flop 30 supplying an output on terminal 18.

It is assumed hereinunder, by way of example, that the VCO 8, when it oscillates at its free frequency, operates at a 500 KHz frequency, which is roughly equal to 32 times the desired frequency of the line synchronization signal.

In such a case, the divider 10 shown in FIG. 2 will be a divider by 32. The counter 26 which receives the output signal of the terminal 11 of the VCO 8 is a 6-bits counter, the outputs $Q_2-Q_5$ of which are connected to the inputs of an AND gate 40, the output of which is connected to the S input of a flip-flop 42. The Q output of this flip-flop is connected to an input of the AND gate 24, the other input of which receives the output of filter 22. The output of the AND gate 24 is connected to the S input of a flip-flop 44, the Q output of which is connected to the up/down U/D input of the up/down counter 28. This up/down counter receives on its clock input the output of an NOR gate 46, one input of which is connected to the terminal $Q_5$ of counter 26, said terminal supplying the up/down counting clock signal, the period of which is close to the line period.

The up/down counter 28 is a 32-states circuit, the outputs $Q_1-Q_5$ of which are connected to the inputs of an AND gate 47 and the complementary outputs of which are connected to the inputs of an AND gate 48. The outputs of the AND gates 47 and 48 are respectively applied to the inputs S and R of flip-flop 30 through respective AND gates 49 and 50. The AND gate 49 is enabled by the output Q of the flip-flop 44 and the AND gate 50 is enabled by the same output signal of flip-flop 44 through an inverter 52. Thus, for any transition to "1" of flip-flop 44, one of the AND gates 49 and 50 is enabled. The outputs of the AND gates 49 and 50 are also applied to two other inputs of the NOR gate 46 in order to stop the incrementation or decrementation of the up/down counter 28 when the latter has reached its maximum or minimum counting, respectively.

The outputs $Q_1$, $Q_2$ and $Q_6$ of counter 26 are connected through an AND gate 54 to the reset input R of flip-flop 44. The output of AND gate 54 is also connected through an OR gate 56 to the reset input R of flip-flop 42 and to the reset input C of counter 26. The second input of the OR gate 56 is connected to the output of the AND gate 24.

Figure 4:
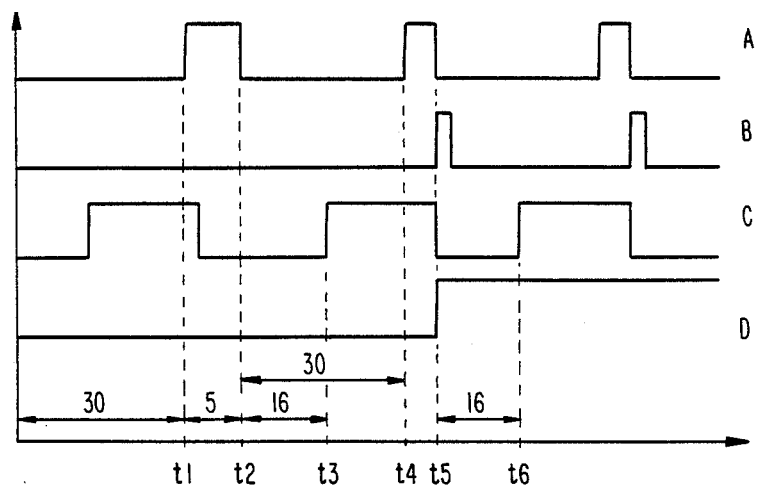
FIG. 4A-D are timing diagrams designed to illustrate in more detail the operation of the circuit according to the instant invention.

The operation of this circuit will be better understood in relation with the time diagrams of FIG. 4. The AND gate 40 supplies a low level signal as long as the outputs $Q_2$, $Q_3$, $Q_4$ and $Q_5$ are set to a low level. When those outputs are set to a high level, which corresponds to a counting of $16+8+4+2=30$ pulses, that is, a duration of 60 microseconds in case the VCO 8 exhibits a free frequency of 500 KHz, the output of the AND gate is set to "1" thus determining the transition to the high level of the output Q of flip-flop 42. This corresponds to the time $t_1$ shown in FIG. 4A. This output Q remains at the high level as long as no signal is applied at the input R of flip-flop 42, for supplying the above-mentioned window.

Assuming there is no line synchronization pulse on the other input of the AND gate 24, the reset of the flip-flop 42 is determined by the output of the AND gate 54 which is connected to the outputs $Q_6$, $Q_2$ and $Q_1$ of counter 26, that is, which switches after $32+2+1=35$ counts, i.e., 70 microseconds. Simultaneously, the counter 26 is also reset. Thus, as shown in FIG. 4A, the window is "closed" after 10 microseconds, at the time $t_2$ The AND gate 24, the other input of which has not received any signal, has not been enabled. The output of the gate 54, at the same time it resets the flip-flop 42 and the counter 26, resets the flip-flop 44 and sets the up/down counter 28 in down counting. This counter 28 receives on its up input the signal $Q_5$ which is set high at a time $t_3$, 16 counts after the time $t_2$. The up/down counter 28 is thus decremented by one unit at that time.

It is now assumed that at the occurrence of the following window, a line synchronization pulse (FIG. 4B) appears during the window. Thus, if the window opens at a time $t_4$ and if the synchronization pulse appears at a time $t_5$, less than 10 microseconds after time $t_4$, by the action of the OR gate 56, the flip-flop 42 and the counter 26 are reset and, due to the transition to "1" of the output of the AND gate 24 at the time $t_5$, the flip-flop 44 is set to "1" enabling the up/down counter 28 to the up state, whereby at the time $t_6$, 16 counts of the counter 26 after its reset, a signal is applied to the up input of the up/down counter 28 incrementing its counting by one unit.

FIG. 4D shows the transition to "1" of the up/down input of the up/down counter 28 at time $t_5$. Since the normal time interval between the synchronization pulses is 64 microseconds, the following line synchronization pulse, if any, will drop into the window supplied by the flip-flop 42 since this window is open during the time interval ranging from 60 to 70 microseconds after the occurrence of the synchronization pulse of the preceding line.

Figure 5:
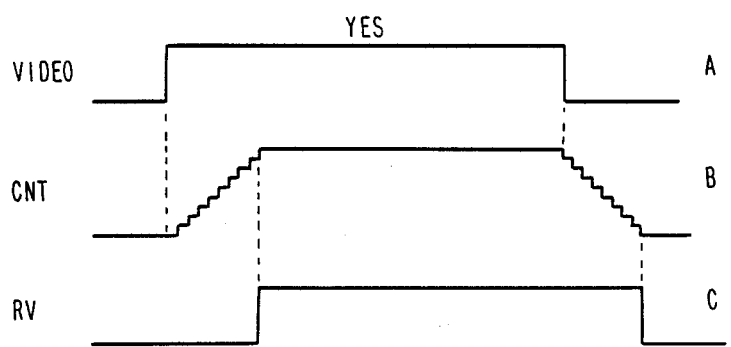
FIG. 5A-C show drawn to a larger scale a timing diagram intended to describe the operation of a device according to the instant invention.

FIGS. 5A–5C are time diagrams intended to illustrate the operation of the instant invention drawn to a larger scale than the time diagrams of FIGS. 4A–4D. The time diagram of FIG. 5A indicates that during a given period, labelled "YES", video pulses are present. Thus, as shown in FIG. 5B, the state of the up/down counter 28 increases to attain a predetermined count, here the value 32. At that time, the AND gate 47 which receives on its five inputs the five outputs of the up/down counter has its state changed and supplies a high level signal which acts upon the S input of the flip-flop 30 through AND gate 49. Therefore, as shown in FIG. 5, a detection signal RV which is set to "1" when the count of the up/down counter 28 has reached 32 is obtained. Then, if it is assumed that the video synchronization signal is not present, the up/down counter is progressively decremented and, when all its outputs are reset, the AND gate supplies a high level signal which is applied to the R input of the flip-flop 30 through the AND gate 50. Then, the signal RV is set to "0" as shown in FIG. 5C.

Although this has not been illustrated, it is clear that, if there is a short interruption of the synchronization pulses, lower than 32 absences of the synchronization tops, followed by a restarting of those pulses, the up/down counter 28 will start counting down but will not reach zero and its state will then increase when the video signal starts again. Therefore, the signal RV will not be interrupted.

Of course, the above description is only one preferred embodiment of the instant invention and those skilled in the art of logic circuits will be able to devise other logic circuits implementing the same functions as those described in relation with the detailed embodiment shown in FIG. 3.

We claim:

1. A line synchronization signal detection circuit for detecting a line synchronization signal in a video signal wherein the synchronization signal is supplied to a phase locked loop comprising a voltage controlled oscillator (VCO) (8) for supplying a line scanning signal to a display means, said detection circuit comprising:
    first means (20) for inhibiting the operation of the loop whereby the VCO freely oscillates at its free frequency, wherein said free frequency is substantially equal to a desired line frequency or multiple of said desired line frequency, in the absence of an enabling signal;
    second means (26, 40, 42, 54, 56) for generating a detection window in relation with the oscillations of the VCO;
    third means (24, 44) for detecting the presence of the synchronization signal in said window;
    fourth means (28, 30, 46–52) comprising an up/down counter (28) selectively operable in incrementing and decrementing modes in response to the output of the third means, and flip-flop means (30) for supplying said enabling signal in response to said up/down counter reaching a predetermined count and until said counter has counted down to a null value.

2. A line synchronization signal detection circuit according to claim 1, wherein said loop comprises a filter (5) having a selectable time constant switchable between high and low values, said filter operable at the low value in response the enabling signal and for a duration predetermined by a duration counter (35).

3. A line synchronization signal detection circuit according to claim 1, wherein the said third means includes a filer (22), the cut-off frequency of which can be switched between a high and a low value, the transition to the high value responsive to said enabling signal.

4. A line synchronization signal detection circuit according to claim 1, wherein the VCO (8) has a free frequency which is an n-fold multiple of a frequency close to the desired line synchronization frequency, wherein said second means comprise:
- a counter (26) having an output connected to an AND gate (40), said AND gate having an output connected to the input of a flip-flop (42) supplying a signal at a first level during a first predetermined number of pulses of the VCO, the corresponding duration being lower than the desired period of the line synchronization signal, and a signal to be a second level forming a window during, at the most, a second predetermined number of pulses of the VCO, the duration corresponding to the sum of the first and second numbers being higher than said desired period, and
- means (54, 56) for resetting said counter at the end of the counting of the second number or in response to the occurrence of a synchronization pulse in the window.

5. A line synchronization signal detection circuit for detecting the presence or the absence of a line synchronization signal in a video signal wherein the synchronization signal is sent to a phase locked loop including a voltage controlled oscillator (VCO) (8) for supplying a line scanning signal to a display means, comprising:
- first means (20) for inhibiting the operation of the loop and allowing the VCO to oscillate at its free frequency, close to the desired line frequency or multiple of this desired line frequency, in the absence of an enabling signal;
- second means (26, 40, 42, 54, 56) for generating a detection window in relation with the oscillating of the VCO, said window being a sliding window, which is synchronized on the first occurrence of a line sync signal and which is sliding again if no sync signal appears therein, the capture time of a sync signal by the window being at the most a determined number of periods of the sync signal;
- third means (24, 44) for detecting the presence of the synchronization signal in said window; and
- fourth means (28, 30, 46–52) including an up/down counter (28) incrementing or decrementing as a function of the output of the third means and flip-flop means (30) acting in such a way that said enabling signal is supplied as soon as the up/down counter has reached a predetermined count and until it has counted down to a null value, said predetermined count being larger than said determined number.

6. A line synchronization signal detection circuit according to claim 5, wherein said phase locked loop comprises a filter (5) having a selectable time constant switchable between predetermined high and low time constants, said filter operable at the low time constant in response the enabling signal and subsequent thereto for a duration predetermined by a duration counter (35).

7. A line synchronization signal detection circuit according to claim 5, wherein the said third means includes a low pass filter (22), the cut-off frequency of which can be switched between a high and a low frequency value, the transition to the high value responsive to said enabling signal.

8. A circuit line synchronization signal detection circuit for detecting a line synchronization signal in a video signal wherein the synchronization signal is supplied to a phase locked loop (PLL) comprising a voltage controlled oscillator (VCO) for supplying a line scanning signal to a display means, said line synchronization signal detection circuit comprising:
- VCO control means responsive to an enabling signal for selectively operating said phase locked loop either in a locked mode or in a free running mode;
- synchronization window generating means for generating a synchronization detection window of a predetermined period;
- synchronization pulse detection means responsive to the video signal and to said synchronization detection window generating means for detecting a synchronization pulse occurring during a period of said detection window period,
- counter means comprising an up/down counter responsive to said synchronization detection means for selectively operating in incrementing or decrementing modes, whereby said up/down counter (i) increments a count stored therein in response to said synchronization pulse detection means detecting a synchronization pulse occurring during a period of said detection window period and (ii) decrements said count stored in said up/down counter in response to said synchronization pulse detection means failing to detect a synchronization pulse occurring during a period of said detection window, said counter means further comprising flip-flop means responsive to an output count signal of said up/down counter whereby said flip-flop means supplies a PLL enable signal in response to a count of said up/down counter has counted down to a null count, whereby said phase locked loop is operated in said locked mode in response to said up/down counter counting up to said predetermined enable count and is operated in said free running mode in response to saudi up/down counter counting down from said predetermined enable count to said null count.

* * * * *